United States Patent Office 3,438,710
Patented Apr. 15, 1969

3,438,710
OPTICAL SIGN DETECTOR
William H. Quick, La Mirada, and Earl D. Jacobs, Tustin, Calif., assignors to North American Rockwell Corporation
Filed Apr. 27, 1965, Ser. No. 451,234
Int. Cl. G01p 3/36, 15/00
U.S. Cl. 356—28    6 Claims

ABSTRACT OF THE DISCLOSURE

A device for detecting the sign difference in frequency between two laser beams. One of the beams is passed through a birefringent ¼ wave plate and then combined with the other beam. The combined beam is then passed through a set of polarizing elements to form two outputs, one being the sum of the two beams and the other being the sum of the two beams with a phase lag of ¼ wavelength on the first beam. By comparing the output of the two polarizing elements, the sign of the frequency difference between the two beams may be determined.

The present invention relates to an optical device for detecting the frequency difference between two optical rays and more particularly to an optical sign detector device for use with a laser accelerometer of a type which uses two paralleled lasers and a common-cavity whereby the higher frequency of the two output rays therefrom is an indication of the direction of sensed acceleration.

In operation the frequencies of the laser rays are changed in a push-pull manner as a function of sensed acceleration. One of these output rays is then passed through a birefringent ¼ wave plate so as to produce a ¼ wavelength lag in one plane of the ray while the output in a plane normal thereto remains unaffected. This dual plane output ray is then combined with the other laser output ray to produce a dual plane output ray which is modulated by the difference frequency of the two laser rays. Polarized optical sensors are used to detect the absolute value of this ray in both planes. The relative phase of the amplitude envelopes thus sensed is an indication of the relative frequency and consequently the direction of sensed acceleration. The envelope frequency itself is measured to indicate the magnitude of the acceleration forces.

In co-pending U.S. patent application Ser. No. 442,100 filed Mar. 23, 1965, entitled "Accelerometer," by E. D. Jacobs et al., there is described in greater detail an accelerometer utilizing two lasers containing a common gas cavity within the laser resonant cavity. In that device sensed acceleration increases the gas density on one side of the gas cavity while decreasing it on the other side. This results in an increase in the index of refraction on one side with a corresponding decrease on the other side. This change in the index of refraction of the gas cavity produces a change in the optical path length and, therefore, in the resonant frequencies of the lasers. Optical sensors are available for detecting the amplitude of these high frequency light rays. The difficulty is that in comparing the difference in frequency between these two optical rays there is no means with which to determine which frequency is the higher. The higher frequency must be determined in order to assign a direction to the sensed acceleration.

It is, therefore, an object of the present invention to provide a means for determining the sign of the frequency difference betwen two optical rays.

It is another object of this invention to provide a novel means for determining the sign and magnitude of the difference between two optical rays.

It is a further object of this invention to provide a means for detecting the sign of the difference between two laser rays.

It is a more general object of this invention to provide a means for determining the amplitude and polarity difference between two optical rays.

These and other objects and advantages of this invention will become more apparent by reference to the following description taken in conjunction with the accompanying drawings, in which.

Figure 1:
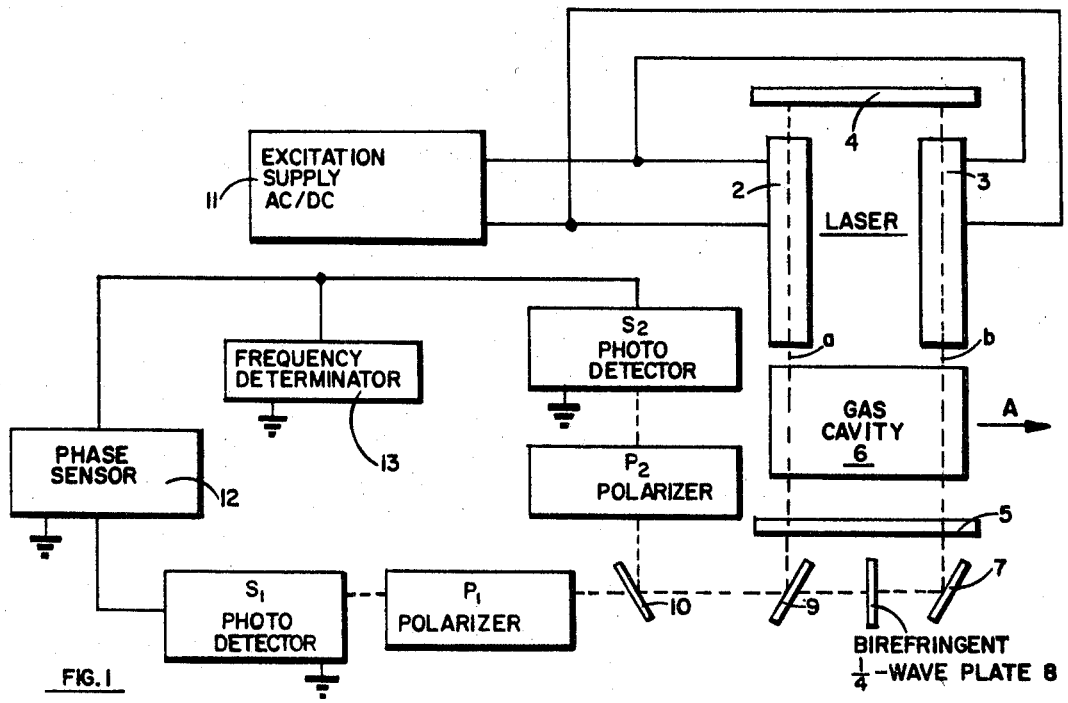
FIG. 1 is a block diagram illustrating the gas laser accelerometer and the means for determining the direction and amplitude of sensed acceleration.

Referring to FIG. 1, laser materials 2 and 3 are contained within a resonant cavity defined by the totally reflecting mirror (fully-silvered) 4 and a partially reflecting mirror (half-silvered) 5. The laser materials 2 and 3 may be either a solid such as a ruby, or a gas mixture such as helium and neon. Interposed in the optical path length of each of these lasers is a gas cavity 6.

Accelerations sensed along the axis A will cause a pressure gradient within the gas cavity 6, which in turn will bunch the gas molecules to one end of the cavity changing the index of refraction seen by the laser rays. This change in the index of refraction is proportional to the density of the gas. If the acceleration is applied in the direction as shown by the arrow along the axis A, the gas density on the left side of the cavity will increase, while on the right side it will decrease. This results in an increase in the index of refraction on the left side with a corresponding decrease on the right side. This change produces a change in the optical path length and, therefore, in the resonant frequencies of the lasers.

Excitation supply 11, which may be either AC or DC supply, is connected to laser materials 2 and 3 to excite the material. In operation the laser material is brought into a condition of negative absorption for some predetermined frequency by excitation supply 11. As a result of spontaneous and stimulated emission, light is generated within the resonant cavity. The generated light travels the length of the laser material and is reflected back and forth between the reflectors 4 and 5. The partially reflecting material 5 allows a portion of the light to leave the cavity and be used for sensing purposes.

The optical ray $b$ from laser material 3 is partially passed through the reflective material 5 and impinges on the totally reflective mirror 7 and is directed thereby through the birefringent ¼-wave plate 8. The plate 8 polarizes the ray into two mutually perpendicular planes, one of which lags the ray $b$ in-phase by ¼-wavelength. The birefringent ¼-wave plate 8 has the characteristic that incident unpolarized light passing through the plate is divided into two rays: one moving with the same velocity in every direction, and the other moving with a velocity that depends upon the direction of its path. These two rays are plane polarized in perpendicular azimuths and are known as the ordinary ray and the extraordinary ray, respectively. A material which may be used for plate 8 is quartz. The two plane polarized ray is then passed through the partially silvered mirror 9 and is combined with the optical ray $a$ from the laser material 2.

The combined rays then impinge on and are split by the partially reflective mirror 10 and sent through the polarizers $P_1$ and $P_2$. The polarizer $P_1$ is set to pass the light rays vibrating in a plane parallel to the ordinary rays from the wave plate 8. This effectively polarizes the light from the ray $a$. Photodetector $S_1$ responds to the modulated envelope signal providing a signal which has an absolute value of $|a_1+b_1|$. Polarizer $P_2$ as set to pass rays parallel to the extraordinary rays from the wave plate 8. This effectively polarizes the light ray $a$ in a plane parallel to the extraordinary polarized light from ray $b$. The polarized rays from polarizer $P_2$ impinge on photodetector $S_2$ which responds to the modulated envelope signal and provides a signal having an absolute value of $$\left|a+b\frac{\lambda}{4}\text{ lag}\right|$$

The signals provided by photodetectors $S_1$ and $S_2$ are fed to phase sensor 12 which detects the direction of the phase shift of the $$\left|a+b\frac{\lambda}{4}\text{ lag}\right|$$

signal with respect to the $|a_1+b_1|$ signal. The direction of this phase shift is proportional to the direction of sensed acceleration or, in other words, the frequency difference between the two rays $a$ and $b$.

Figure 2:
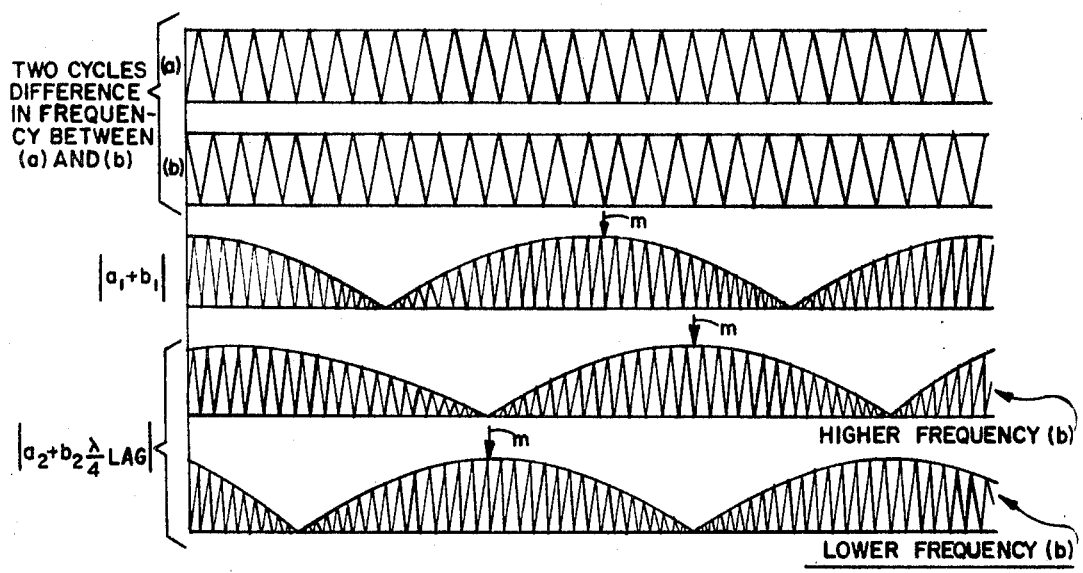
FIG. 2 illustrates wave forms present in the optical sign detector under various operating conditions.

Referring to FIG. 2, the two unpolarized rays $a$ and $b$ are descriptively shown in the first two wave forms as having a frequency difference proportional to acceleration which is equal to two cycles. The $|a_1+b_1|$ absolute value of the two-cycle modulated rays impinging on photosensor $S_2$ is shown in the third wave form with a maximum value designated by the arrow labeled $m$. The last two wave forms illustrate the $$\left|a_2+b_2\frac{\lambda}{4}\text{ lag}\right|$$

wave forms with respect to the wave forms impinging on photodetector $S_2$. When ray $b$ has a higher frequency than ray $a$ arrow $m$ is offset a predetermined amount to the right. If ray $b$ has a lower frequency, the maximum value designated by arrow $m$ will be offset a predetermined amount to the left.

If rays $a$ and $b$ are in-phase at the beginning of the period, the absolute value of $|a_1+b_1|$ will be a maximum. The combination of $$\left|a_2+b_2\frac{\lambda}{4}\text{ lag}\right|$$

will not, however, be at a maximum. If ray $b$ is of a higher frequency than ray $a$, it will gain on ray $a$ until they are in-phase ¼-wave of the difference in frequency later. If, however, ray $b$ is of a lower frequency, it will begin to lag still further behind until a null or minimum is reached ¼-wave later. It is then possible to determine whether the ray $a$ or the ray $b$ has the higher frequency by their relative phase relationship. The frequency which is the main determination of acceleration can be detected from either of these rays by means of frequency determinator 13 or a pulse counter which could upon counting pulses connect the count directly to velocity.

It will be apparent to those skilled in the art that many variations, modifications and applications of the invention in addition to those specifically mentioned herein can be made without departing from the principles of the invention. The invention, therefore, is not to be construed as limited except as defined in the following claims.

We claim:
1. Apparatus for determining the sign of the frequency difference between two optical rays comprising:
   a birefringent medium for polarizing one of said optical rays into two components in two orthogonal planes and conducting these components at different optical velocities so that a phase shift results between the phase of the components in said planes;
   means for combining said other optical ray with said two polarized components;
   means for splitting said combined rays into a first and second ray;
   a first polarizer for polarizing said first combined ray in a plane parallel to one of said two planes;
   a second polarizer for polarizing said second combined ray in a plane parallel to the other of said two planes;
   a first and second photodetector for detecting said first and second polarized rays respectively; and
   means for determining the phase shift of said first polarized ray with respect to said second polarized ray such that the phase shift indicates the sign of the frequency difference between said optical rays.

2. The apparatus of claim 1 wherein said birefringent medium is a ¼-wave plate which shifts the phase of one of said rays ¼-wavelength.

3. An optical sign detector, comprising in combination:
   a first and second coherent light ray, said rays at different frequencies;
   a birefringent medium interposed in the path of said first ray, said birefringent medium separating said first ray into ordinary and extraordinary rays;
   means for combining said second coherent light ray with said ordinary and said extraordinary rays;
   means for splitting said combined rays into a first and second combined ray;
   means for polarizing said first combined ray in a plane parallel to said ordinary ray;
   means for polarizing said second combined ray in a plane parallel to said extraordinary wave;
   a first and second photodetector means upon which said first and second polarized ray impinges respectively;
   means responsive to said first and second photodetector means for detecting any phase differential between said polarized rays so as to indicate which of said coherent light rays is of a higher frequency.

4. An optical sign detector, comprising in combination:
   a first and second optical ray, said rays at different frequencies;
   means interposed in the path of said first ray for polarizing said first ray into two components in first and second orthogonal planes and conducting these components at different optical velocities so that a phase shift results between the phase of the components in said planes;
   means for combining said second optical ray with said two components;
   means for splitting said combined rays into first and second combined rays;
   a means for polarizing said first combined ray in a plane parallel to said first plane;
   a means for polarizing said second combined ray in a plane parallel to said second plane; and
   means responsive to said plane parallel polarized rays for detecting any relative phase shift between said rays, said phase shift indicative of the sign of the frequency difference between said first and said second optical rays.

5. An optical sign detector, comprising in combination:
   a first and second frequency modulated optical ray, said optical rays at different frequencies;
   a birefringent medium interposed in the path of said first ray, said medium separating said first ray into ordinary and extraordinary rays having a predetermined phase difference;

means for polarizing said second optical ray in planes parallel to said ordinary and extraordinary rays;
means for combining said similarly polarized waves; and
means responsive to said similarly combined waves for detecting relative phase shift and thereby determining which of said optical rays is of a higher frequency.

6. The detector of claim 5 wherein said frequency modulated optical rays are coherent laser rays and said birefringent medium is a ¼-wave plate.

References Cited

UNITED STATES PATENTS 3,134,840  5/1964  Gamo.

FOREIGN PATENTS 1,085,350  7/1960  Germany.

OTHER REFERENCES

Lasers for Distance Measurement, Measurement and Control, vol. 3, No. 11, November 1964, pp. 431–432.

Branin, F. H.: A Bidirectional Counter for Use in Optical Interferometry, J.O.S.A., vol. 43, No. 10, October 1953, pp. 839–848.

Corey et al.: Length Measuring Laser Interferometer, A.E.C. Research and Development Report, June 19, 1964, pp. 7–9.

RONALD L. WIBERT, *Primary Examiner.*

O. B. CHEW II, *Assistant Examiner.*

U.S. Cl. X.R.

73—516